Figure 1:
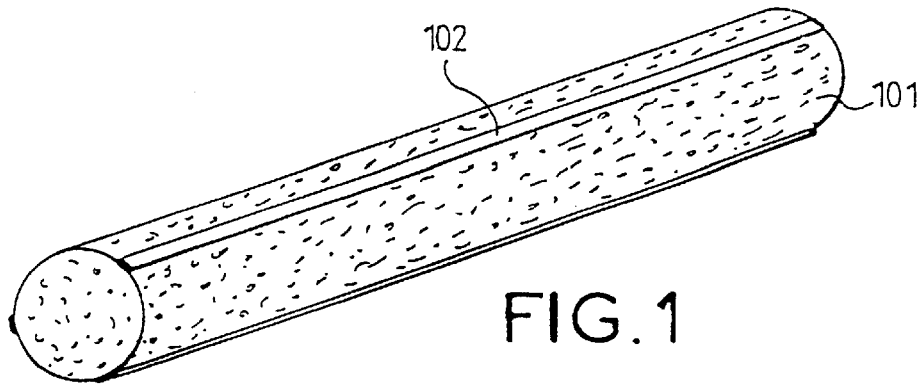

United States Patent [19]

Carpenter et al.

[11] Patent Number: 5,902,430
[45] Date of Patent: May 11, 1999

[54] PROCESS FOR MANUFACTURING AN ACOUSTIC LINEAR ANTENNA

[75] Inventors: Allan Lloyd Carpenter, Surrey Downs, Australia; Jean Bertheas, Villeneuve Loubet, France; Gilles Moresco, Cagnes Sur Mer, France; Robert Rivoira, Biot, France

[73] Assignee: Thomson Marconi Sonar Pty Limited, Rydalmere, Australia

[21] Appl. No.: 08/875,602

[22] PCT Filed: Jan. 30, 1996

[86] PCT No.: PCT/FR96/00149

§ 371 Date: Oct. 14, 1997

§ 102(e) Date: Oct. 14, 1997

[87] PCT Pub. No.: WO96/24861

PCT Pub. Date: Aug. 15, 1996

[30] Foreign Application Priority Data

Feb. 10, 1995 [FR] France .................................. 95 01570

[51] Int. Cl.⁶ ................................ G01V 1/38; G01V 1/20
[52] U.S. Cl. .......................... 156/148; 156/185; 156/190; 156/192; 156/256; 174/101.5; 367/20; 367/154
[58] Field of Search ................. 367/20, 154; 174/101.5; 156/148, 185, 190, 192, 195, 256, 257, 267

[56] References Cited

U.S. PATENT DOCUMENTS

| 4,180,103 | 12/1979 | Mollere ................................. 367/20 X |
| 4,491,939 | 1/1985 | Carpenter ............................ 367/154 X |
| 4,733,379 | 3/1988 | Lapetina et al. .................... 367/154 X |
| 4,809,243 | 2/1989 | Bledsoe et al. . |
| 5,521,885 | 5/1996 | Harvey .................................... 367/154 |

FOREIGN PATENT DOCUMENTS

| 0 237 616 | 9/1987 | European Pat. Off. . |
| 0 508 904 | 10/1992 | European Pat. Off. . |
| 0 560 674 | 9/1993 | European Pat. Off. . |
| WO 87/03379 | 6/1987 | WIPO . |

*Primary Examiner*—Jeff H. Aftergut
*Attorney, Agent, or Firm*—Oblon, Spivak, McClelland, Maier & Neustadt, P.C.

[57] ABSTRACT

Methods for making linear acoustic antennas designed to be towed behind a boat, wherein open-cell foam cylinders (101) are opened lengthwise (103) and electroacoustic receiver modules (101) are placed therein. After closing the cylinders, they are arranged end-to-end and a series of layers of porous nonwoven material, reinforcing nets (111) and wiring cables are wound around the cylinder surfaces. Finally, a protective sheath is extruded onto the cylinders and their end portions are joined together. The manufacture of such antennas may thus be mechanised using cable technologies.

10 Claims, 2 Drawing Sheets

PROCESS FOR MANUFACTURING AN ACOUSTIC LINEAR ANTENNA

The present invention relates to processes which make it possible to manufacture a linear acoustic antenna of the type intended to be towed behind a boat in order to carry out acoustic explorations, for example when searching for oil.

Such antennas are formed in sections, preferably identical sections, joined together by connectors. These sections are generally formed by a sheath containing receiver hydrophones and various electronic devices. Electrical cables run from one end of the section to the other in order to enable these electronic devices to be supplied with power and to return the signals received by the hydrophones back on board the boat. Furthermore, in order to achieve sufficient tensile strength, load-taking cables are used which link the connectors at the two ends and which prevent tensile loads being applied to the sheath or to the electrical connection cables.

In order to protect the devices contained in the sheath, as well as to maintain acoustic continuity between the external medium, from which the sound waves to be detected originate, and the hydrophones loaded properly to detect these sound waves, as well as for other more secondary, but nevertheless very practical, reasons, it is necessary to fill the internal free volume of the sheath with a suitable substance.

To do this, it is known in particular to fill each section with a dielectric oil having a density less than that of water and maintained under a slight overpressure with respect to the pressure of the external medium. In this case, the load-taking cables are generally incorporated in the sheath. Implementation of this first process requires a filling operation which is particularly expensive to carry out. Furthermore, the risk of leaks is in no way insignificant.

It is also known, in particular from U.S. Pat. No. 4,491,939 filed according to the PCT procedure on Aug. 10, 1982 with Australian priority from Aug. 13, 1981, the inventor of which being Allan L. Carpenter and the proprietor of which being The Commonwealth of Australia, and granted on Jan. 1, 1985, to manufacture each section by placing the load-taking cables at the centre of the latter and by filling the sheath with an acoustic gel which embeds and immobilizes the devices, such as the hydrophones, which are found inside this sheath. Thus, a virtually "solid" antenna is obtained. Such a technique is similar to that used for the manufacture of cables. However, the performance characteristics achieved are not completely satisfactory since they do not guarantee complete acoustic continuity between the medium external to the antenna and the internal medium of the antenna, thereby disturbing the acoustic signals reaching the hydrophones. Furthermore, because of the central position of the load-taking cables, the sheath is found to creep somewhat, thereby both increasing the disturbance of the acoustic signals and making it more difficult to handle the antenna, in particular to wind it around a storage drum.

In order to overcome these drawbacks, the invention provides a process for manufacturing a linear acoustic antenna, mainly characterized in that it comprises the following steps:

manufacturing a number of open-cell foam cylinders of handleable length, and adhesively bonding at least three longitudinal strips of inextensible fabric onto the surface of these cylinders so as to be distributed uniformly around the periphery of each cylinder:

making a longitudinal incision in the cylinder along its entire length, hollowing out cavities in the central part thus opened, and fitting electroacoustic receiver modules in these cavities;

closing the cylinder, but leaving the connection leads for the electroacoustic modules to protrude through the longitudinal slit, and adhesively bonding this slit;

arranging the cylinders constituting one section of the antenna end to end, and winding a first layer of porous nonwoven material around the assembly, with overlap of one turn over another;

placing a ribbon of connection cables, as one or more crossed plies, over this entire structure;

winding a second layer in a spiral around this ribbon of cables, with no overlap;

connecting the electroacoustic modules to the cables of the connection ribbon;

winding a third layer of nonwoven material around the second layer, with overlap;

braiding a number of yarns on this third layer in order to form a net, and holding this net in place on the third layer by spots of adhesive;

slipping very strong radial reinforcement rings over this net, and holding these rings in place by adhesively bonding them to the net;

winding a fourth layer of porous nonwoven material around this assembly, with overlap;

braiding a net formed by wide-meshed strands;

extruding a protective sheath reinforced with longitudinal yarns over this fourth layer;

producing and connecting the ends of the section; and impregnating the foam forming the interior of the section with a dielectric oil under a slight overpressure.

According to another characteristic, the second layer in a spiral is made of nonwoven material.

According to another characteristic, the second layer in a spiral is made with a polyester film.

According to another characteristic, the foam cylinder is made from a foam tube into which foam cylinders matched to the internal diameter of this tube are inserted.

According to another characteristic, a continuous helical tape is used instead of the radial reinforcement rings, this tape being wound around or extruded over the foam cylinders.

Figure 2:
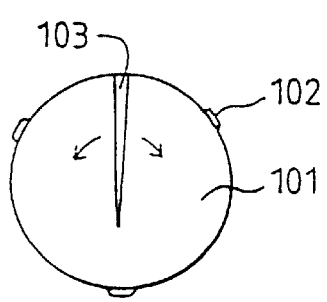
Figure 3:
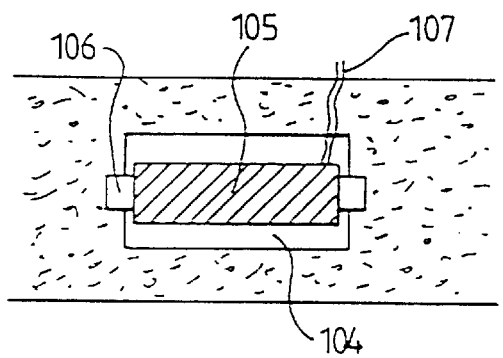
Figure 4:
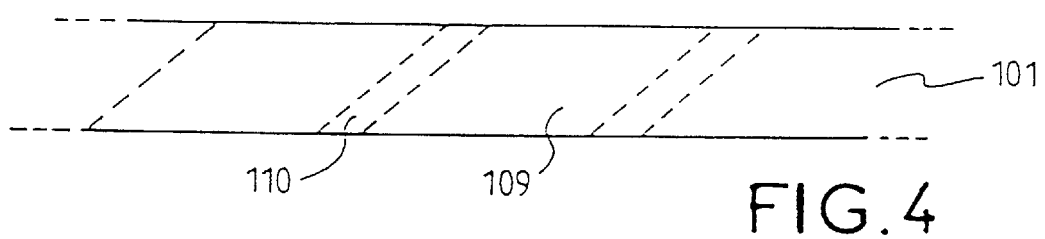
Figure 5:
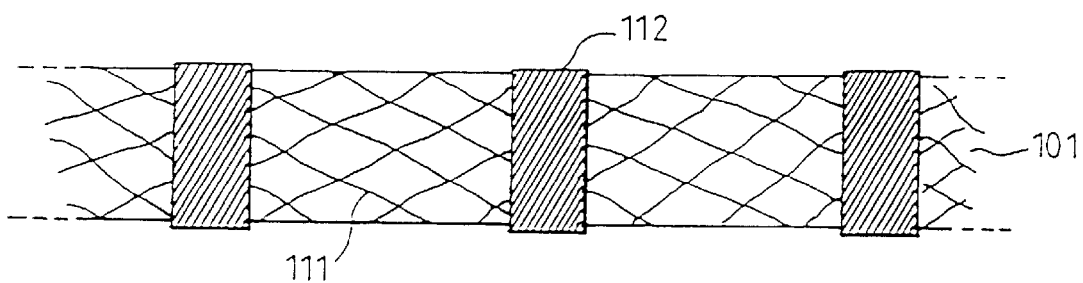
Figure 6:
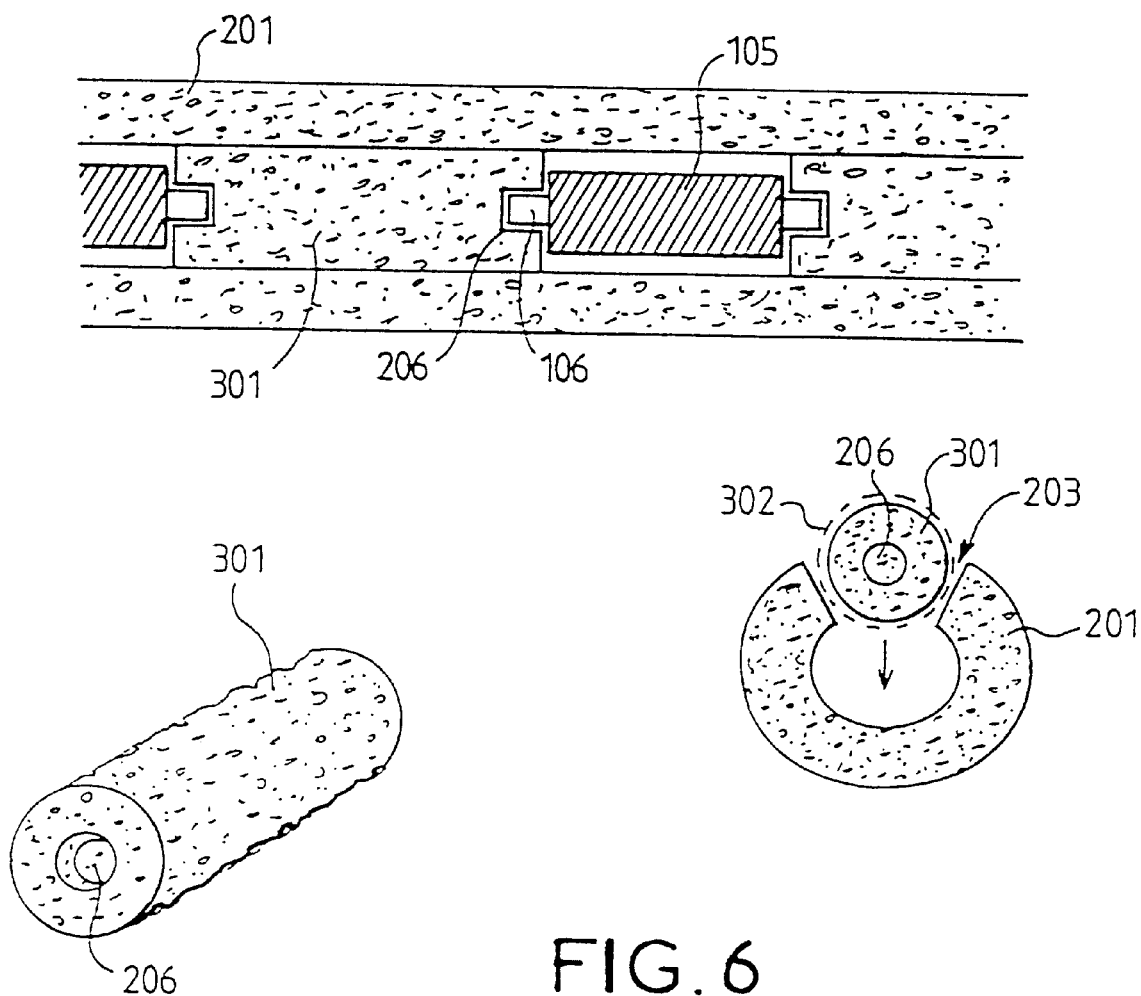

Other features and advantages of the invention will become clearly apparent in the following description, given by way of non-limiting example, with regard to the appended figures which represent:

FIG. 1, a perspective view of a foam cylinder forming the core of an antenna section;

FIG. 2, a cross-sectional view of this cylinder after it has been slit;

FIG. 3, a longitudinal sectional of the cylinder containing a receiver hydrophone;

FIGS. 4 and 5, side views of the cylinder at various stages in winding the external layers of the antenna; and FIG. 6, side views, in perspective, of an alternative way of manufacturing the cylinder.

The structure of the antenna manufactured in accordance with the process according to the invention is derived from the one described, at the very least partly, in European Patent Application No. 92/401011.9 filed on Apr. 10, 1992 under Australian Priority No. PK 5569 which is itself filed in Australia on Apr. 11, 1991 in the name of AUSSYS.

In a first step, shown in FIG. 1, open-cell foam cylinders are produced in a known manner, for example by moulding or by cutting out from a block, these cylinders having a length, for example one metre, such that they can be easily handled. At least three longitudinal strips 102 of inextensible fabric are adhesively bonded to these cylinders so as to be distributed uniformly around the circumference.

In a second step, shown in FIG. 2, these cylinders are slit along their entire length, making a longitudinal slit 103 which stops within the thickness of the cylinder close to that surface of the latter which is diametrically opposite the opening into this slit 103. This enables the cylinder to be opened into two.

In a third step, shown in FIG. 3, axial cavities 104 are hollowed out inside the cylinder, using for this the opening obtained by holding down, on each side in the direction of the arrows shown in FIG. 2, the two half-parts of the cylinder which are defined by the slit 103. This makes it possible to place the electroacoustic modules 105 intended for receiving the acoustic waves to be placed inside the cavities. These acoustic modules comprise, for example, a hydrophone and a preamplifier. They include end studs 106 which enables them to be prevented from moving in the cavity 104 along the axis of the foam cylinder. They also include connection leads 107 which are made to pass through the slit 103.

In a fourth step, the foam cylinder is closed up, trapping the electroacoustic modules 105 in the cavities 104 and leaving the connection leads 107 to emerge on the outside of the cylinder. Having closed up the cylinder in this way, it is adhesively bonded using spots of adhesive which hold it in this position.

In a fifth step, shown in FIG. 4, all the cylinders intended to form a single section of the antenna are arranged end to end, and a first layer of a nonwoven material 109 is wound around this assembly, forming a tape whose successive turns overlap quite considerably at the place represented by the oblique dotted lines 110. This makes it possible to smooth out the surface of the assembly in anticipation of the wiring. This nonwoven material is porous in order to allow subsequent impregnation of the foam. The connection leads are then extracted manually so that they are not masked by the layer of nonwoven material.

In a sixth step, the ribbon of cables serving to connect the modules 105 is placed around the structure thus obtained, by winding this ribbon in the form of one or more crossed plies.

In a seventh step, a second layer of porous nonwoven material is wound in a spiral, this time with no overlap, in order to keep in position the ribbon of wires which were put into place in the seventh step. By way of a variant, a film, preferably a polyester film, could be used instead of the nonwoven material. In both cases, the connection leads may be visually located through the layer thus put into place.

In an eighth step, the electroacoustic modules are wired up. This procedure starts by identifying the outputs of the modules which remain visible under the ribbon of cables. According to one variant, and in anticipation of the case in which some of the wires were to remain hidden, it is possible to equip them beforehand, during the fourth step, with a small permanent magnet. A small commonplace, field-sensitive electronic apparatus may be used to detect this magnet, the said apparatus emitting an audible or light signal above a certain threshold.

Having extracted the connection leads, they are connected to the cables of the ribbon put in place during the sixth step, making use of the colour codes on the various wires to identify them. By way of a variant, bar codes could be used.

In a ninth step, the wiring having been carried out, a third layer of porous nonwoven material is wound, this time with the turns overlapping each other.

In a tenth step, shown in FIG. 5, a wide-meshed net 111 obtained using yarns, preferably polyester yarns, is braided on the surface of the third layer of nonwoven, over the assembly thus obtained. This braiding is carried out, for example, using a conventional cabling machine for the manufacture of electrical cables. To avoid any movement of the net with respect to the inner nonwoven layer, the polyester yarns may be held in place on this layer by means of spots of adhesive distributed more or less uniformly over the inner nonwoven layer.

In an eleventh step, reinforcement rings 112 manufactured from a very strong material, for example of the epoxy/carbon-fibre type, are slipped over the assembly, on top of the net. These rings are preferably placed in line with the electroacoustic modules 105 and are held in place by adhesively binding them to the net 111.

In a twelfth step, a fourth layer of porous nonwoven material is wound, this time again with overlap, so as to be able to facilitate the subsequent passage through the extrusion head for extruding the sheath. This fourth layer also prevents the sheath which will be extruded over the assembly thus obtained from adhering to the radial reinforcement rings 112.

In a thirteenth step, another net, formed from wide-meshed strands, preferably made of polyester, is placed on top of this fourth layer.

In a fourteenth step, the sheath intended to protect the assembly is extruded over the surface of the fourth layer of nonwoven, furnishing the sheath at the same time, using a known technique, with strong fibres produced, for example, with a material such as KEVLAR (registered trademark). This extrusion is performed conventionally using an extruder fitted with a crosshead into which the composite material [sic] coming from the fourteenth step may be fed, via one end, and extracted, via the other end, coated with the protective layer coming from the body of the extruder. The reinforcing yarns are themselves introduced through holes drilled in a ring around the first end of the head through which the composite to be covered enters.

In a fifteenth step, the ends of the section of antenna thus obtained are produced in a completely conventional manner, starting by making the assembly to the desired length and freeing therefrom the longitudinal reinforcement yarns. Next, a load-taking ring is placed on each of these ends, which ring forms the periphery of each end junction, and the longitudinal reinforcement yarns, correctly distributed and tensioned, are anchored onto this ring. Next, the electrical wires are freed from the wiring ribbon and connected to the connection components of the end connectors. Finally, the mechanical components of these connectors are put into place, fixing them to the load-taking rings in order in this way to produce the end junctions.

In a sixteenth and final step, the foam cylinders 101 forming the core of the section thus obtained are impregnated with a suitable dielectric oil. This filling may be performed, for example, by means of a valve located on one of the connectors according to a technique patented by the Applicant Company. After having waited long enough for the foam to be well impregnated, the assembly is put under a slight overpressure, degassing is carried out and then the operation is completed by allowing the valve to close.

By way of a variant, the invention proposes, as shown in FIG. 6, to use not foam cylinders but foam tubes 201 containing inside them smaller cylinders 301, the external diameter of which coincides with the lower diameter [sic] of the tubes. These internal cylinders 301 are provided on their end faces with cavities 206 matching the studs 106 of the electroacoustic modules 105. These cylinders are furthermore covered with a film 302, preferably polyester film.

Thus, in order to manufacture the result composite [sic] from the fourteenth step in the main description, the tubes 201 are slit along longitudinal incisions 203 and the cylinders 206 and the modules 105 are inserted into these tubes. Next, the tubes 201 are closed up and the incisions 203 sealed using spots of adhesive. The situation is then the same as at the end of the main step 4.

By way of a variant, it is also possible to locate the electrical outputs of the modules using X-rays.

By way of a variant, it is also possible to replace the radial reinforcement rings 112 with a helical continuous tape wound around the length of the section. Optionally, this tape may be obtained by extrusion using a rotating head which will cut the layer thus extruded.

We claim:

1. Process for manufacturing a linear acoustic antenna, characterized in that it comprises the following steps:

manufacturing a number of open-cell foam cylinders of handleable length, and adhesively bonding at least three longitudinal strips of inextensible fabric onto the surface of these cylinders so as to be distributed uniformly around the periphery of each cylinder;

making a longitudinal incision in the cylinder along its entire length, hollowing out cavities in the central part thus opened, and fitting electroacoustic receiver modules in these cavities;

closing the cylinder, but leaving connection leads for the electroacoustic modules to protrude through the longitudinal slit, and adhesively bonding this slit;

arranging the cylinders constituting one section of the antenna end to end, and winding a first layer of porous nonwoven material around the assembly, with overlap of one turn over another;

placing a ribbon of connection cables, as one or more crossed plies, over this entire structure;

winding a second layer in a spiral around this ribbon of cables, with no overlap;

connecting the electroacoustic modules to the cables of the connection ribbon;

winding a third layer of nonwoven material around the second layer, with overlap;

braiding a number of yarns on this third layer in order to form a net, and holding this net in place on the third layer by spots of adhesive;

slipping very strong radial reinforcement rings over this net, and holding these rings in place by adhesively bonding them to the net;

winding a fourth layer of porous nonwoven material around this assembly, with overlap;

braiding a net formed by wide-meshed strands;

extruding a protective sheath reinforced with longitudinal yarns over this fourth layer;

producing and connecting the ends of the section; and impregnating the foam forming the interior of the section with a dielectric oil under a slight overpressure.

2. Process according to claim 1, charaterized in that the second layer in a spiral is made of porous nonwoven material.

3. Process according to claim 2, characterized in that the foam cylinder is made from a foam tube into which foam cylinders matched to the internal diameter of this tube are inserted.

4. Process according to claim 2, characterized in that a continuous helical tape is used instead of the radial reinforcement rings, this tape being wound around or extruded over the foam cylinders.

5. Process according to claim 1, characterized in that the second layer in a spiral is made with a polyester film.

6. Process according to claim 5, characterized in that the foam cylinder is made from a foam tube into which foam cylinders matched to the internal diameter of this tube are inserted.

7. Process according to claim 5, characterized in that a continuous helical tape is used instead of the radial reinforcement rings, this tape being wound around or extruded over the foam cylinders.

8. Process according to claim 1, characterized in that the foam cylinder is made from a foam tube into which foam cylinders matched to the internal diameter of this tube are inserted.

9. Process according to claim 8, characterized in that a continuous helical tape is used instead of the radial reinforcement rings, this tape being wound around or extruded over the foam cylinders.

10. Process according to claim 1, characterized in that a continuous helical tape is used instead of the radial reinforcement rings, this tape being wound around or extruded over the foam cylinders.

* * * * *